United States Patent
Chang et al.

(10) Patent No.: US 6,674,942 B2
(45) Date of Patent: Jan. 6, 2004

(54) OPTICAL COLLIMATOR AND METHOD FOR MAKING SAME

(75) Inventors: Yao-Hao Chang, Tu-Chen (TW); Chih Chiang Chang, Tu-Chen (TW); Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/029,685

(22) Filed: Dec. 21, 2001

(65) Prior Publication Data

US 2003/0091280 A1 May 15, 2003

(30) Foreign Application Priority Data

Nov. 9, 2001 (TW) .......................................... 90219302

(51) Int. Cl.[7] .............................. G02B 6/32; G02B 6/36
(52) U.S. Cl. ............................ 385/34; 385/78; 385/85
(58) Field of Search .............................. 385/34, 78, 85

(56) References Cited

U.S. PATENT DOCUMENTS 5,048,912 A * 9/1991 Kunikane et al. ............. 385/23
6,289,152 B1 * 9/2001 Zhang et al. .................. 385/33
2001/0055119 A1 * 12/2001 Wood et al. ................. 356/519
2002/0094169 A1 * 7/2002 Benator et al. ............... 385/55
2002/0191881 A1 * 12/2002 Chen et al. .................... 385/11
2003/0063853 A1 * 4/2003 Huang et al. .................. 385/34

FOREIGN PATENT DOCUMENTS

JP     363216010 A  *  9/1988  ............ G02B/6/38

* cited by examiner

*Primary Examiner*—John D. Lee
*Assistant Examiner*—Tina M Lin
(74) *Attorney, Agent, or Firm*—Wei Te Chung

(57) ABSTRACT

An optical collimator (20) includes an optical fiber (21), a metal ferrule (22), a Graded Index (GRIN) lens (23) and an outer metal tube (24). The optical fiber has an exposed end (211) which is coated with metal. The exposed end of the optical fiber is inserted into the ferrule and laser welded thereto. The GRIN lens is also coated with metal. A plurality of soldering holes (241) is defined in a periphery of the outer tube. Solder is applied to the ferrule and the GRIN lens through the holes to firmly connect the outer tube, the ferrule and the GRIN lens together. After assembly, if the position of the GRIN lens or the optical fiber is found to be inaccurate, the GRIN lens and the ferrule can be easily resoldered.

13 Claims, 5 Drawing Sheets

OPTICAL COLLIMATOR AND METHOD FOR MAKING SAME

BACKGROUND OF THE INVENTION

1. Field of the Invention

The present invention is related to optical collimators and methods for making them, and more particularly to optical collimators which do not use glue or epoxy to attach components thereof together.

2. Description of the Prior Art

An optical collimator with a Graded Index (GRIN) lens is used for collimating scattered light emitting from an output end of an optical fiber. The collimated light may be efficiently and controllably utilized for transmission or testing.

As shown in FIG. 1, a conventional optical collimator 100 comprises an optical fiber 110, a ceramic ferrule 120, a GRIN lens 130 and an outer glass tube 140. The ferrule 120 has an inner end 122, an outer end 124, and a through hole 126 defined between the inner and outer ends 122, 124. A diameter of the through hole 126 is greater than a diameter of the optical fiber 110. A cone-shaped opening (not labeled) is defined in the outer end 124, in communication with the through hole 126. The optical fiber 110 is typically sealed in the through hole 126 by UV-curved epoxy and 353-ND epoxy. To improve optical performance, the inner end 122 of the ferrule 120 and an inner end 112 of the optical fiber 110 are ground and polished to an oblique angle relative to an imaginary line that is perpendicular to respective longitudinal axes of the ferrule 120 and the optical fiber 110. The angle is typically between 6 and 8 degrees. The GRIN lens 130 has an inner end 132 and an outer end 134. The inner end 132 of the GRIN lens 130 is adjacent the inner end 122 of the ferrule 120, and is obliquely ground and polished to be parallel to the inner end 122 of the ferrule 120. The longitudinal axis of the GRIN lens 130 is aligned with the longitudinal axis of the optical fiber 110. The ferrule 120 and the GRIN lens 130 are positioned and aligned in the glass tube 140, so that output light from the GRIN lens 130 can be accurately focused on the inner end 112 of the optical fiber 110. The ferrule 120 and the GRIN lens 130 are then fixed in place in the glass tube 140 by UV-curved epoxy and 353-ND epoxy.

When the optical fiber 110 is epoxied to the ferrule 120, and when the GRIN lens 130 and the ferrule 120 are epoxied to the glass tube 140, excess epoxy may contaminate the inner ends 112, 132 of the optical fiber 110 and GRIN lens 130. Such contamination reduces the output of the optical fiber 110, and diminishes the performance of the GRIN lens 130. The optical collimator 100 is prone to have large insertion loss. In addition, such contamination is difficult to remove. Furthermore, it is difficult to readjust the relative positions of the optical fiber 110 and the GRIN lens 130 after they have been secured in position. Moreover, typical epoxies need baking to be cured. Common epoxies have a coefficient of thermal expansion several times larger than that of the GRIN lens 130. During baking of the epoxy, the accurate relative positions of the optical fiber 110 and the GRIN lens 130 are frequently altered. Accurate focusing of light from the optical fiber 110 to the GRIN lens 130 is accordingly diminished.

An improved optical collimator is needed to overcome the above-described numerous disadvantages of conventional optical collimators.

SUMMARY OF THE INVENTION

Accordingly, an object of the present invention is to provide an inexpensive optical collimator having low insertion loss.

Another object of the present invention is to provide an optical collimator that eliminates the risk of contamination caused by epoxy or glue.

A further object of the present invention is to provide an optical collimator that allows easy readjustment of positions of a Graded Index (GRIN) lens and an optical fiber therein.

To solve achieve the objects set out above, an optical collimator in accordance with a preferred embodiment of the present invention comprises an optical fiber, a metal ferrule, a GRIN lens and an outer metal tube. The optical fiber has an exposed end which is coated with metal. The exposed end of the optical fiber is inserted into the ferrule and laser welded thereto. The GRIN lens is also coated with metal. A plurality of soldering holes is defined in a periphery of the outer tube. Solder is applied to the ferrule and the GRIN lens through the holes to firmly connect the outer tube, the ferrule and the GRIN lens together. After assembly, if the position of the GRIN lens or the optical fiber is found to be inaccurate, the GRIN lens and the ferrule can be easily resoldered.

Other objects, advantages and novel features of the present invention will be apparent from the following detailed description of preferred embodiments thereof with reference to the attached drawings, in which:

DETAILED DESCRIPTION OF THE PREFERRED EMBODIMENTS

Figure 1:
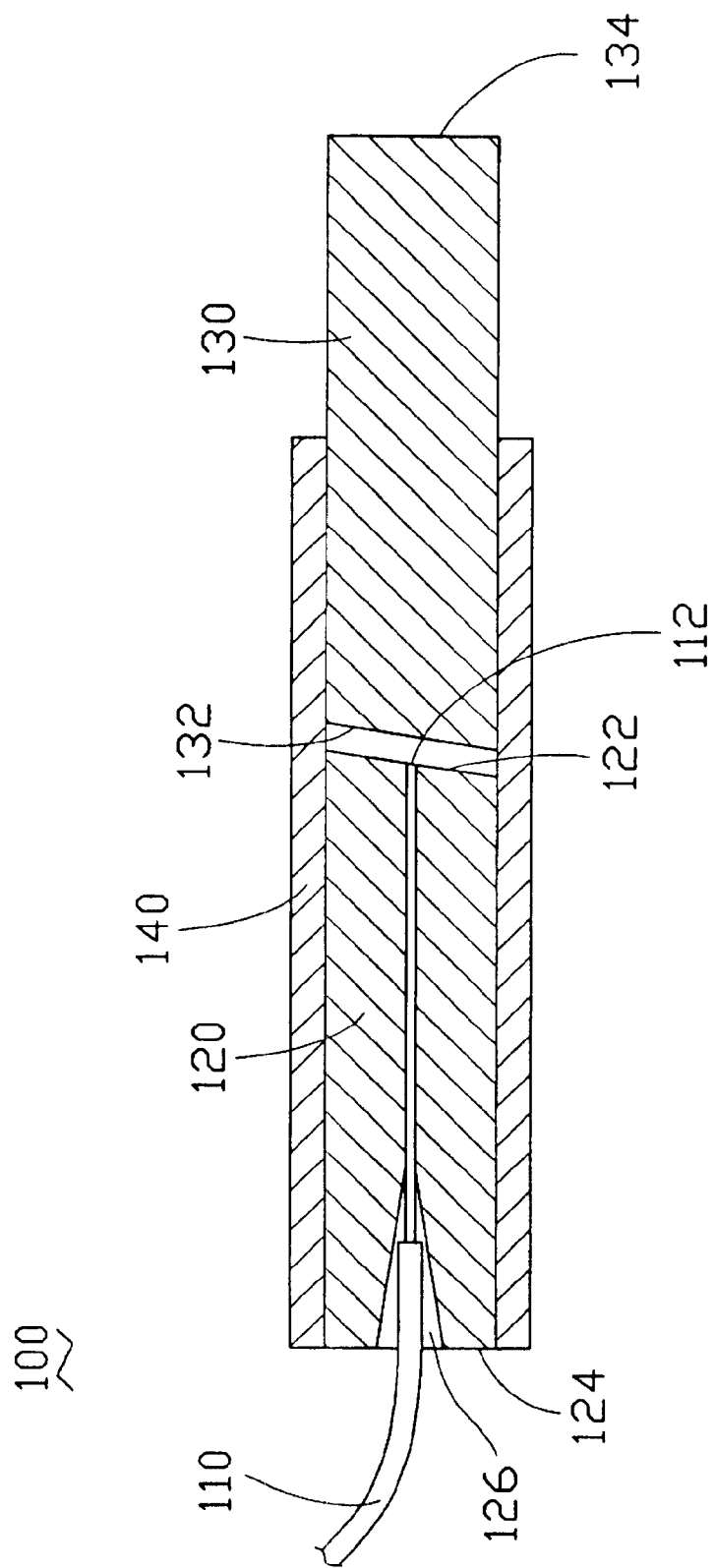
FIG. 1 is a cross-sectional view of a conventional optical collimator.

For facilitating understanding, like components are designated by like reference numerals throughout the various embodiments of the invention as shown in the various drawing figures.

Reference will now be made to the drawing figures to describe the present invention in detail.

Figure 2:
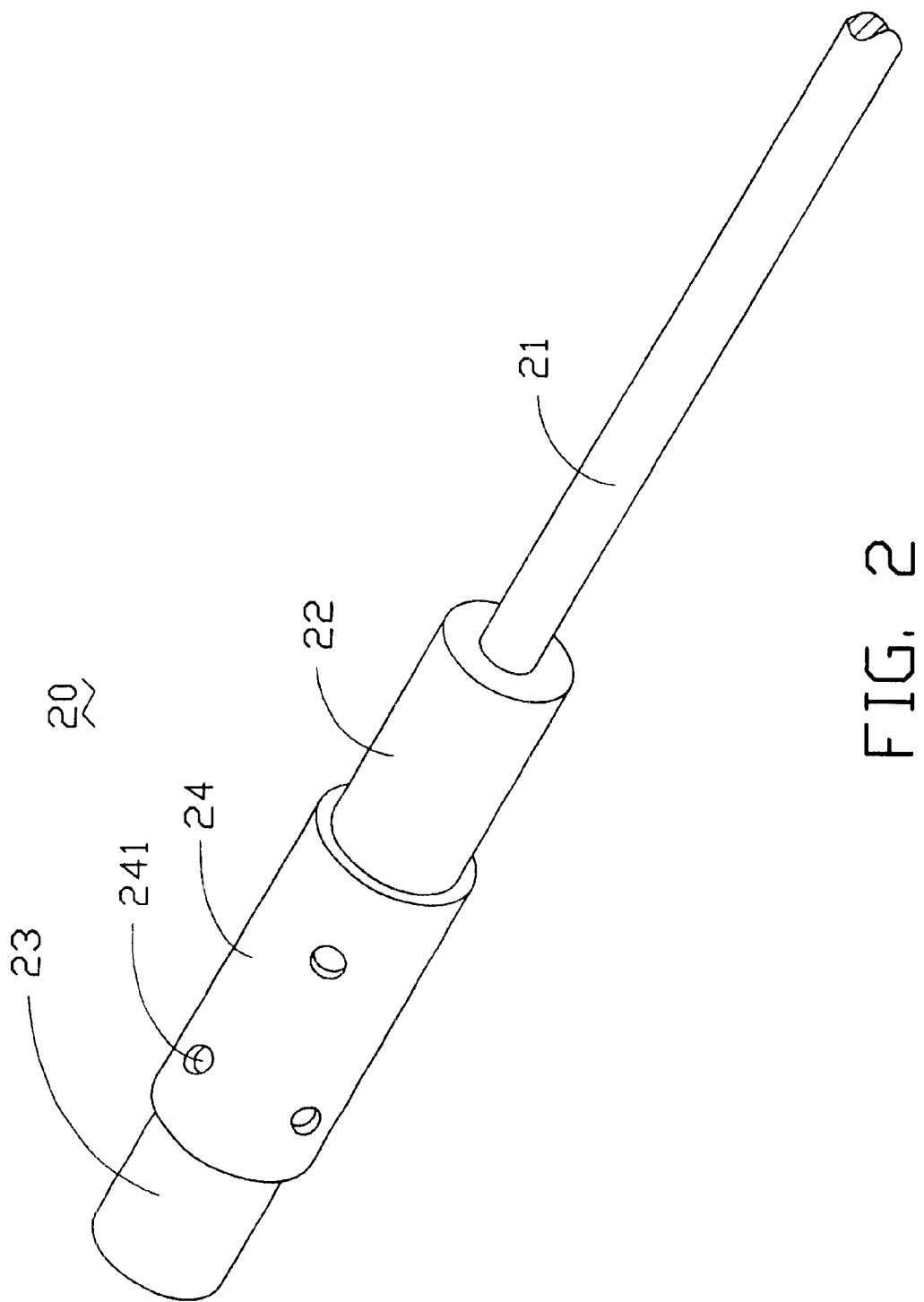
FIG. 2 is a perspective view of an optical collimator in accordance with a preferred embodiment of the present invention.
Figure 3:
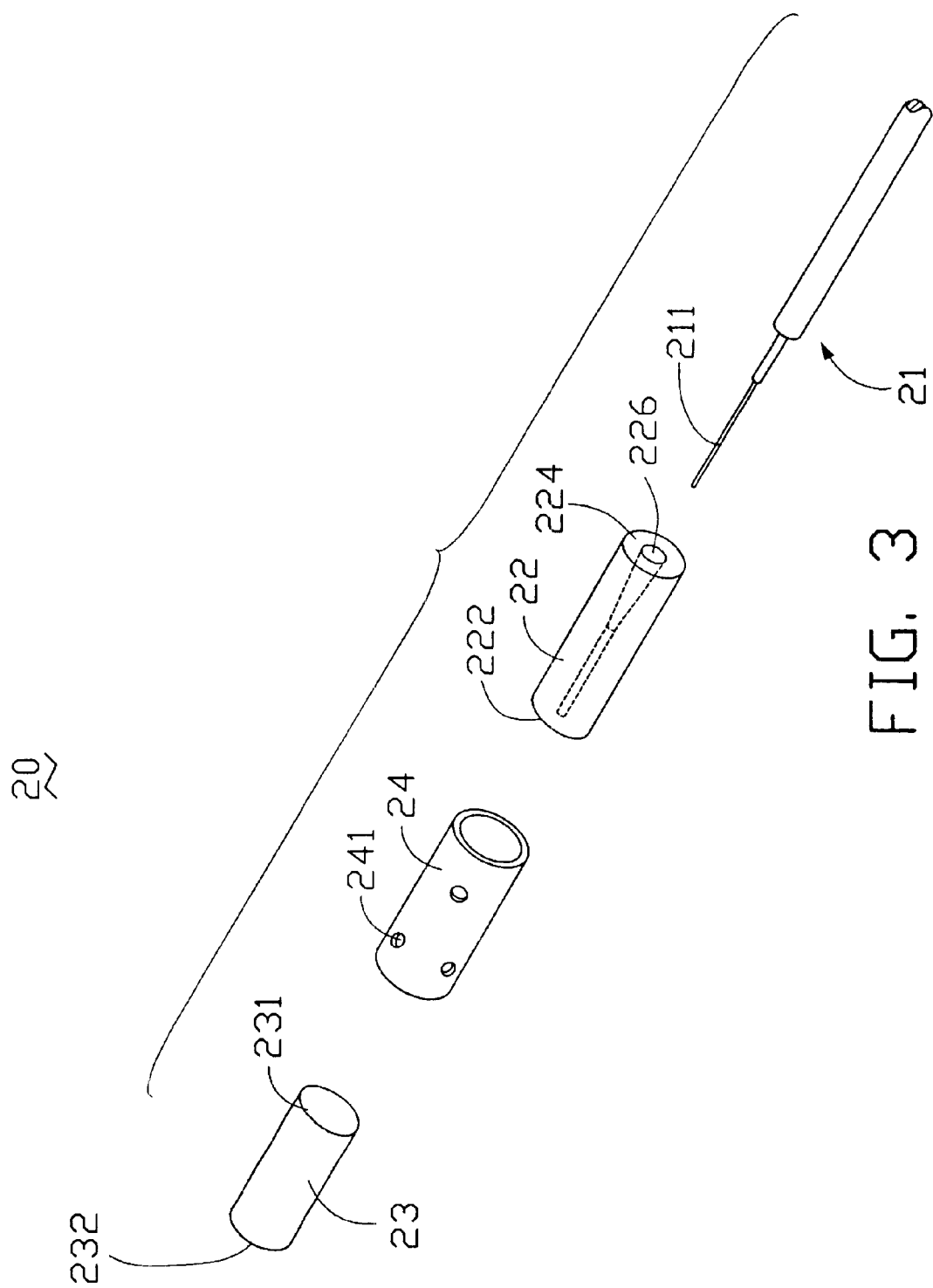
FIG. 3 is an exploded view of the optical collimator of FIG. 2.
Figure 4:
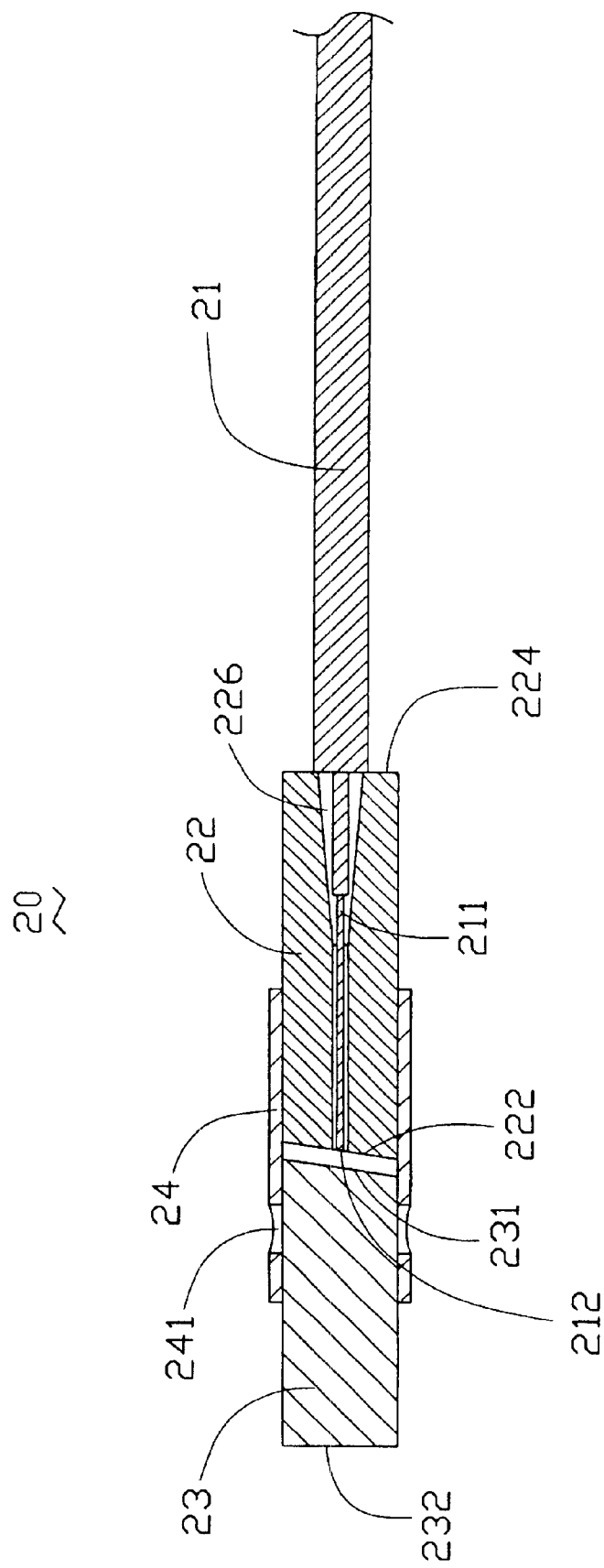
FIG. 4 is a cross-sectional view of the optical collimator of FIG. 2.

Referring to FIGS. 2–4, an optical collimator 20 in accordance with a preferred embodiment of the present invention comprises an optical fiber 21, a metal ferrule 22, a GRIN lens 23 and an outer metal tube 24.

The optical fiber 21 has a front end 211, which is an exposed optical fiber end that has had its cladding removed. A coating (not labeled) of gold or another suitable metal is applied to the front end 211, to enable it to be secured to the ferrule 22 by laser welding. The ferrule 22 is made of Covar alloy or another suitable metal which has a coefficient of thermal expansion similar to that of glass. The ferrule 22 has an inner end 222, an outer end 224, and a through hole 226 defined between the outer and inner ends 224, 222. An internal diameter of the through hole 226 is greater than a diameter of the front end 211 of the optical fiber 21. A cone-shaped opening (not labeled) is defined in the outer end 224, in communication with the through hole 226. The cone-shaped opening facilitates insertion of the front end 211 of the optical fiber 21 into the through hole 226. The front end 211 is secured in the through hole 226 by laser welding. Alternatively, the front end 211 may be secured in the through hole 226 by other suitable welding such as soldering. The front end 211 has an inner end face 212 which is obliquely ground and polished. An angle (not shown) is defined between the inner end face 212 and an imaginary line that is perpendicular to a longitudinal axis of the optical fiber 21. The angle is typically between 6 and 8 degrees. An end face (not labeled) of the inner end 222 of the ferrule 22 is obliquely ground and polished to be coplanar with the inner end face 212.

The GRIN lens 23 is coated with metal, and includes an inner end 231 and an outer end 232. An end face (not labeled) of the inner end 231 of the GRIN lens 23 is adjacent the inner end 222 of the ferrule 22, and is obliquely ground and polished so that it is parallel to the end face of the inner end 222. The GRIN lens 23 has a longitudinal axis which is aligned with the longitudinal axis of the optical fiber 21.

The outer tube 24 is made from a same material used for making the ferrule 22. A plurality of soldering holes 241 is defined in a periphery of the outer tube 24. Solder is applied to the ferrule 22 and the GRIN lens 23 through the holes 241, to firmly connect the outer tube 24, the ferrule 22 and the GRIN lens 23 together.

In assembly, the front end 211 of the optical fiber 21 is inserted into through hole 226 of the ferrule 22 via the cone-shaped opening. The front end 211 and the ferrule 22 are connected together by laser welding. The ferrule 22 and the GRIN lens 23 are then mounted in the outer tube 24 from opposite ends of the outer tube 24. The ferrule 22 and the GRIN lens 23 are spaced a suitable distance apart, with the end faces of the respective inner ends 222, 231 thereof being parallel to each other. Thereafter, the ferrule 22 and the GRIN lens 23 are soldered to the outer tube 24 by applying solder at the holes 241 of the outer tube 24.

Because the ferrule 22 and the GRIN lens 23 of the optical collimator 20 of the present invention are respectively soldered to the outer tube 24 through the holes 241, adjustment of positions of the GRIN lens 23 and the optical fiber 21 relative to each other can be easily performed. The optical collimator 20 having optimal optical performance is quickly and conveniently obtained. In addition, if after assembly the position of the GRIN lens 23 or the optical fiber 21 is found to be inaccurate, the problem can be easily corrected by resoldering.

Moreover, assembly of the optical fiber 21, the ferrule 22, the GRIN lens 23 and the outer tube 24 is achieved without any need for glue or epoxy. Therefore, problems associated with using glue or epoxy are completely eliminated by the optical collimator 20.

Figure 5:
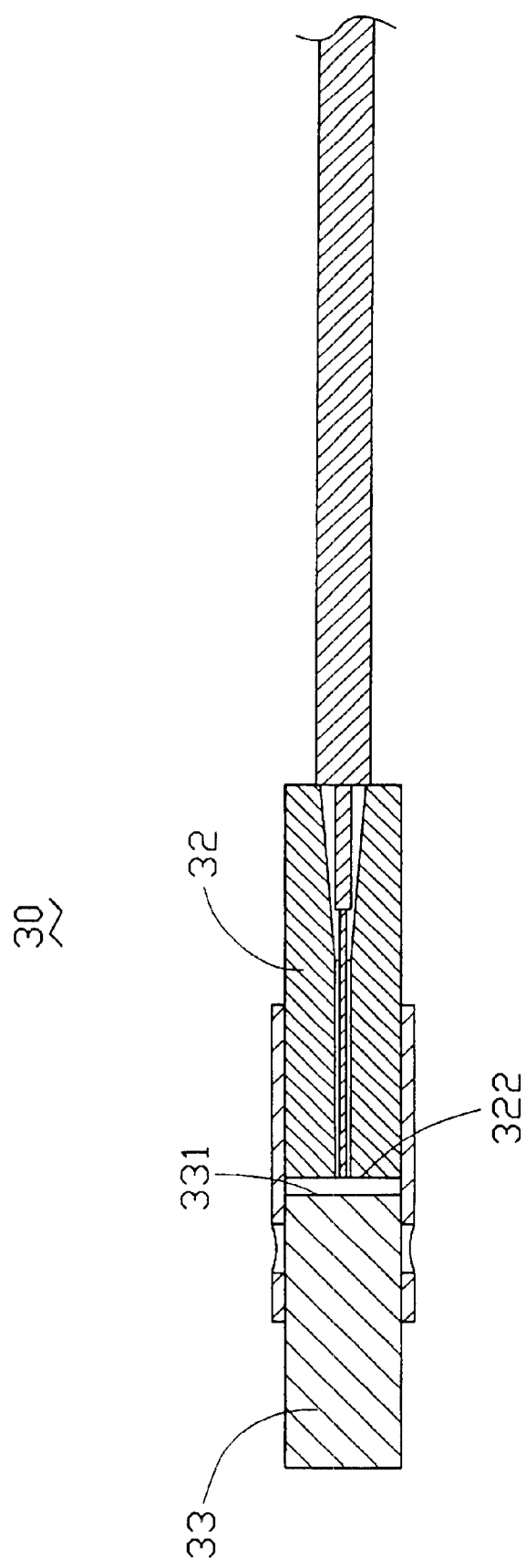
FIG. 5 is a cross-sectional view of an optical collimator in accordance with an alternative embodiment of the present invention.

FIG. 5 shows an optical collimator 30 in accordance with an alternative embodiment of the present invention. The optical collimator 30 has a structure similar to that of the optical collimator 20 of the preferred embodiment. However, end faces of an inner end 322 of a metal ferrule 32 and of an inner end 331 of a GRIN lens 33 are ground and polished to be perpendicular to respective longitudinal axes of the metal ferrule 32 and the GRIN lens 33.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical collimator comprising:

an optical fiber having an exposed end which is coated with metal;

a metallic ferrule, the exposed end of the optical fiber extended in the ferrule and welded thereto thereby sealing the optical fiber;

a Graded Index lens coated with metal; and a metallic outer tube, the Graded Index lens and the ferrule received in the tube and secured thereto by soldering.

2. An optical collimator as described in claim 1, wherein the exposed end of the optical fiber is extended in the ferrule and laser welded thereto.

3. An optical collimator as described in claim 1, wherein the metal coating the exposed end of optical fiber is gold.

4. An optical collimator as described in claim 1, wherein the metal forming the ferrule has a coefficient of thermal expansion which is similar to that of glass.

5. An optical collimator as described in claim 4, wherein a metal forming the outer tube is the same as the metal forming the ferrule.

6. An optical collimator as described in claim 1, wherein the Graded Index lens have an end face in the outer tube which is ground and polished to an angle between 6 and 8 degrees relative to a line that is perpendicular to a longitudinal axis of the Graded Index lens.

7. An optical collimator as described in claim 1, wherein the ferrule has an inner end face which is adjacent the Graded Index lens, and the inner end face defines an angle between 6 and 8 degrees relative to a line that is perpendicular to a longitudinal axis of the ferrule.

8. An optical collimator as described in claim 1, wherein the ferrule and the Graded Index lens have end faces in the outer tube, the end faces being ground and polished to be perpendicular to respective longitudinal axes of the ferrule and of the Graded Index lens.

9. An optical collimator as described in claim 1, wherein the outer tube defines holes in a periphery thereof, the soldering of the Graded Index lens and the ferrule to the outer tube being at the holes.

10. A method for forming an optical collimator, comprising the following steps:

preparing an optical fiber, removing a cladding of the optical fiber to exposed an end of the optical fiber, and coating the exposed end with metal;

preparing a metal ferrule, inserting the exposed end of the optical fiber into the ferrule and welding the exposed end to the ferrule;

preparing a metal tube and a Graded Index lens, coating the Graded Index lens with metal, and inserting the Graded Index lens and the ferrule into the tube from opposite open ends of the tube; and soldering the Graded Index lens and the ferrule to the tube.

11. The method as described in claim 10, wherein the tube defines a plurality of holes in a periphery thereof, the soldering of the Graded Index lens and the ferrule to the tube being at the holes.

12. The method as described in claim 10, wherein the exposed end of the optical fiber is welded to the ferrule by laser welding.

13. An exopy-free optical collimator comprising:
a metallic ferrule enclosing an optical fiber therein;
a GRIN lens coated with a metal layer circumferentially; and
a metallic outer tube radially defining through holes; wherein
said ferrule and said GRIN lens are head to head inserted into two opposite sides of the tube and fixed to the tube via solder through said through holes.

* * * * *